Feb. 13, 1951     R. D. HULL     2,541,360

ADJUSTABLE GEARING

Filed Jan. 27, 1949

INVENTOR.
R Dell Hull

BY

Jennu, Edmonds, Morton and Barrows
ATTORNEYS

UNITED STATES PATENT OFFICE 2,541,360

ADJUSTABLE GEARING

R. Dell Hull, Tulsa, Okla.

Application January 27, 1949, Serial No. 73,055

9 Claims. (Cl. 74—405)

This invention relates to clutch mechanism and more particularly to a clutch that is automatically caused to function by rotation of the driving shaft, but which permits free rotation of the driven shaft when in disengaged position.

While the clutch is capable of general use, it will be described in connection with a fishing reel of the "spinning reel" type such as is disclosed and claimed in my copending application, Serial No. 19,211 filed April 6, 1948. The illustration of the invention in such manner is not intended as a limitation.

In a fishing reel, and in many other applications, there is need for a clutch that can be readily engaged by rotation of the drive shaft but which will remain disengaged to permit free rotation of the driven shaft as long as the drive shaft is not rotated. I provide such a clutch by forming a groove, cut on a circular radius, in the drive shaft. The drive shaft is capable of longitudinal movement to bring a gear or other transmitting member into operative position to supply power to the driven shaft. I further provide a clutch operating member intersecting the drive shaft at the location of the groove and having a similar groove formed therein. The parts are so dimensioned and proportioned that when the groove on the clutch operating member is in alignment with the groove on the drive shaft, the drive shaft is in a retracted position and is disengaged from the driven shaft. By moving the clutch operating member, against the tension of a spring or similar device, to a position where a portion other than the groove of this member is in engagement with the drive shaft, the drive shaft is shifted longitudinally to bring the gears or other connection between the drive shaft and the driven shaft into operative position. Further, by providing an off-center contact between the two grooved surfaces, these surfaces function as cams and upon rotation of the drive shaft in either direction, the spring controlling the clutch operating member automatically moves this member to a position to cause shifting of the drive shaft into operative or engaged position.

In the accompanying drawing I have shown one embodiment of the invention. In this showing:

Figure 3:
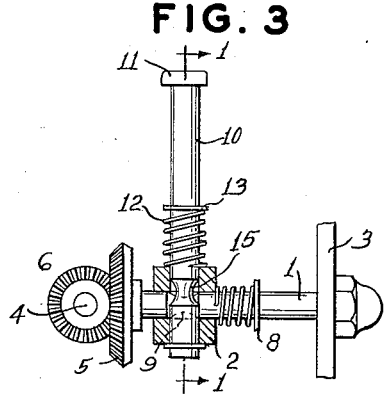
Fig. 3 is a vertical, sectional view, at right angles to Fig. 1, with the parts in the position shown in Fig. 1.

Referring to the drawing, the reference numeral 1 designates a drive shaft which is mounted for longitudinal sliding movement in a bearing block 2. Suitable means are provided for rotating the drive shaft, such as handle 3. A driven shaft 4 is located adjacent the drive shaft and suitable means are provided for transmitting power from the drive shaft to the driven shaft. As shown, these shafts are arranged at right angles to each other and are provided with bevel gears 5 and 6, respectively, which are in mesh with each other when the drive shaft is shifted to the left as shown in Fig. 3 of the drawing.

Figure 1:
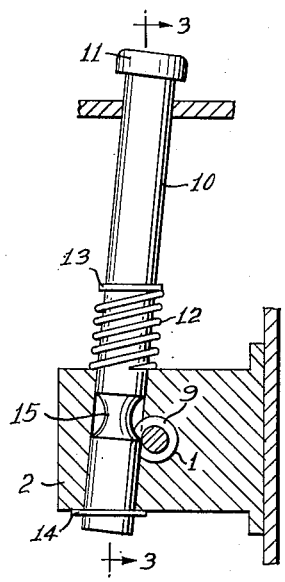
Fig. 1 is a vertical, sectional view on line 1—1 of Fig. 3 showing the parts in gear engaging position.
Figure 2:
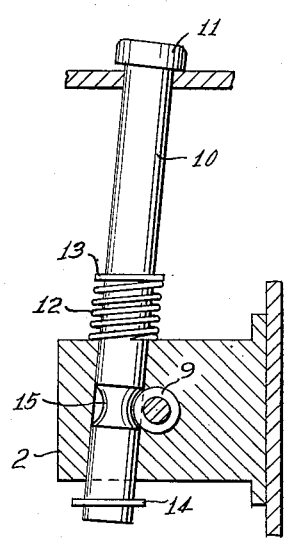
Fig. 2 is a similar view showing the position of the parts when the gears are disengaged.
Figure 4:
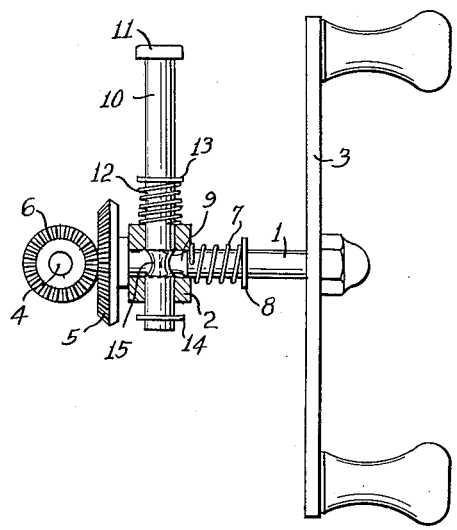
Fig. 4 is a similar view with the parts in the other position, or in the position shown in Fig. 2.

A spring 7 is arranged on shaft 1 between the bearing block and a washer 8 mounted on the shaft. This spring normally urges the shaft to the right in Fig. 3 and Fig. 4 of the drawing to disengage gears 5 and 6. The portion of the shaft within the bearing block is provided with a circumferential groove 9 curved on a circular radius. A clutch operating rod or shaft 10 extends through a bore in the bearing block perpendicular to the shaft in one plane (see Figs. 3 and 4) but slightly inclined to the vertical plane through the shaft at right angles thereto (see Figs. 1 and 2). The rod 10 is provided with an operating button 11 on its end. A coil spring 12 is arranged between the top of the bearing block and a washer 13 on the rod to normally urge the rod upwardly. A washer 14 is arranged on the rod beyond the bearing block to limit its upward movement. A portion of the rod within the bearing block is also provided with a circumferential groove 15 cut on the radius of a circle.

The operation of the clutch will be apparent from the foregoing description. With the parts in the position shown in Fig. 4 of the drawing, the grooves 9 and 15 are in contact with each other. Shaft 1 is moved to the right under the influence of coil spring 7 and the gears are disengaged, permitting free rotation of driven shaft 4. When the clutch is used in a fishing reel, the gears are so arranged during casting.

If the gears are initially in engagement, they may be disengaged by moving rod 10 downwardly against the force of spring 12. This brings the grooves into registration and permits the shaft 1 to move to the right under the force of spring 7. The spacing between the face of the block 2 and the adjacent face of the hub of pinion 5 is so dimensioned that the left hand end of the groove 9 will stop before reaching the axis of the rod 10. This provides an off-center contact between the curved surfaces of the grooves when the pinions are disengaged. As long as shaft 1 remains stationary, the pressure of coil spring 7 will maintain the grooves in engagement and maintain the pinions disengaged, thus permitting free rotation of shaft 4.

When the shaft 4 is to be driven, the pinions 5 and 6 may be re-engaged by turning handle 3 in either direction. Upon rotation of shaft 1 the curved surfaces of grooves 9 and 15 function as cams. The rotation of the shaft 1 initiates relative movement of these surfaces. The coil spring 12 is of greater strength than coil spring 7 and when this movement is begun, the greater strength of this spring causes an upward movement of rod 10. After about a quarter revolution of shaft 1, the frictional engagement of the curved surfaces is overcome. Rod 10 then moves upwardly under the force of spring 12. The cam action of the sloping surface of groove 15 and the sloping surface of groove 9 moves the shaft 1 to the left to bring the pinions into engagement. Thus, rotation of the drive shaft 1 causes meshing of the gears without resorting to any other mechanical operation to engage the clutch.

The invention, while described in connection with a clutch in which the engaging gears are moved in and out of mesh by the movement of one of the shafts, is capable of other uses and may be employed in any construction in which one of two intersecting shafts is moved longitudinally of its axis.

I claim:

1. Clutch mechanism comprising a longitudinally movable drive shaft having a groove in a portion thereof and a rod arranged at an angle thereto and having a groove at the point of intersection of the shaft, the rod being movable to bring the grooves into and out of registration to cause longitudinal movement of the drive shaft, a driven shaft and a connection between the drive shaft and the driven shaft operative when the drive shaft is in one position and inoperative when the drive shaft is in a second position.

2. Clutch mechanism comprising a longitudinally movable drive shaft having a circumferential groove cut in a portion thereof on a circular radius, a rod arranged at an angle thereto and having a circumferential groove cut on a circular radius at the point of intersection of the shaft, the rod being movable to bring the grooves into and out of registration to cause longitudinal movement of the drive shaft, a driven shaft and a connection between the drive shaft and the driven shaft operative when the drive shaft is in one position and inoperative when the drive shaft is in a second position.

3. Clutch mechanism comprising a longitudinally movable drive shaft having a groove in a portion thereof and a rod arranged at an angle thereto and having a groove at the point of intersection of the shaft, the rod being movable to bring the grooves into and out of registration to cause longitudinal movement of the drive shaft, a driven shaft and gearing on the drive shaft and the driven shaft adapted to be moved into and out of mesh with the movement of the drive shaft.

4. Clutch mechanism comprising a longitudinally movable drive shaft having a groove in a portion thereof and a rod arranged at an angle thereto and having a groove at the point of intersection of the shaft, the rod being movable to bring the grooves into and out of registration to cause longitudinal movement of the drive shaft, a driven shaft and gearing on the drive shaft and driven shaft, means for urging the drive shaft to a position to bring said gearing out of mesh, and means for urging the rod to a position to shift the drive shaft to bring the gearing into mesh.

5. Clutch mechanism comprising a longitudinally movable drive shaft having a groove in a portion thereof and a rod arranged at an angle thereto and having a groove at the point of intersection of the shaft, the rod being movable to bring the grooves into and out of registration to cause longitudinal movement of the drive shaft, a driven shaft and a connection between the drive shaft and the driven shaft operative when the drive shaft is in one position and inoperative when the drive shaft is in a second position, the position of the groove in the drive shaft with respect to the axis of the rod when the drive shaft is in its inoperative position being such that rotation of the drive shaft initiates movement of the rod to shift the drive shaft to an operative position.

6. A mechanical movement mechanism, comprising a pair of relatively movable intersecting shafts, mutually journalling grooves of arcuate cross-section in the intersecting portions of the shaft, the arcuate surfaces of said grooves being normally in continuous engagement and forming cooperating cams actuatable by axial movement of one of said shafts to produce axial movement of the other.

7. A mechanical movement mechanism, comprising a pair of relatively movable intersecting shafts, mutually journalling grooves of arcuate cross-section in the intersecting portions of the shafts, the surfaces of said grooves being normally engaged in an off-center relation, whereby axial or rotational movement of one of said shafts will produce axial movement of the other.

8. A mechanical movement mechanism, comprising a pair of relatively movable intersecting shafts, mutually journalling grooves of arcuate cross-section in the intersecting portions of the shafts, the surfaces of said grooves being normally engaged in an off-center relation, whereby axial or rotational movement of one of said shafts will produce axial movement of the other, and resilient means normally urging said shafts to relative positions providing said off-center relation of said grooves.

9. A mechanical movement mechanism, comprising a pair of relatively movable intersecting shafts, mutually journalling grooves of arcuate cross-section in the intersecting portions of the shafts, the surfaces of said grooves being normally engaged in an off-center relation, whereby axial or rotational movement of one of said shafts will produce axial movement of the other, and resilient means normally urging said shafts to relative positions providing said off-center relation of said grooves, one of said resilient means being of greater force than the other.

R. DELL HULL.

REFERENCES CITED

The following references are of record in the file of this patent:

UNITED STATES PATENTS

| Number | Name | Date |
|---|---|---|
| 1,235,035 | Jensen | July 31, 1917 |
| 2,316,266 | Marr | Apr. 13, 1943 |
| 2,335,752 | Geiger | Nov. 30, 1943 |

FOREIGN PATENTS

| Number | Country | Date |
|---|---|---|
| 593,575 | France | Aug. 26, 1925 |
| 511,773 | Germany | Nov. 1, 1930 |